US007176915B1

(12) United States Patent
Isner (10) Patent No.: US 7,176,915 B1
(45) Date of Patent: Feb. 13, 2007

(54) SUBDIVIDING ROTATION IN A CHARACTER USING QUATERNION INTERPOLATION FOR MODELING AND ANIMATION IN THREE DIMENSIONS

(75) Inventor: Michael Isner, Santa Monica, CA (US)

(73) Assignee: Avid Technology, Inc., Tewksbury, MA (US)

( * ) Notice: Subject to any disclaimer, the term of this patent is extended or adjusted under 35 U.S.C. 154(b) by 80 days.

(21) Appl. No.: 10/216,402

(22) Filed: Aug. 9, 2002

(51) Int. Cl.
G09G 5/00 (2006.01)
G06T 15/00 (2006.01)
G06T 13/00 (2006.01)
G06T 15/70 (2006.01)

(52) U.S. Cl. ............... 345/419; 345/606; 345/474; 345/653; 345/954; 382/295; 382/297; 382/300

(58) Field of Classification Search ........ 345/473–475, 345/418–420, 953–954, 959, 606, 643, 645, 345/649, 659, 652–653, 949, 427–428, 581, 345/619; 382/259, 300, 293–297
See application file for complete search history.

(56) References Cited

U.S. PATENT DOCUMENTS

| | | | | |
|---|---|---|---|---|
| 4,797,836 | A * | 1/1989 | Witek et al. | 345/473 |
| 5,590,261 | A * | 12/1996 | Sclaroff et al. | 345/473 |
| 5,854,634 | A * | 12/1998 | Kroitor | 345/473 |
| 6,522,331 | B1 * | 2/2003 | Danks | 345/473 |
| 6,577,315 | B1 * | 6/2003 | Kroitor | 345/473 |
| 6,798,415 | B2 * | 9/2004 | Lake et al. | 345/474 |
| 2002/0196258 | A1 * | 12/2002 | Lake et al. | 345/474 |

OTHER PUBLICATIONS

Animation Magazine, Visual EFX & Technology, Thumbs Up for Janimation's Spy Kids 2 Effects, Aug. 15, 2002, 3 pages.
Baerlocher, Paolo, "Inverse Kinematics Techniques For the Interactive Posture Control Of Articulated Figures", Thesis No. 2383, Ecole Polytechnique Federale de Lausanne, 2001, pp. 1-156.
Baerlocher, Paolo, et al., Parametrization and range of motion of the ball-and-socket joint, Proc. of AVATARS' 2000 Conference, Nov. 2000, pp. 180-190.
Dam, Erik B., et al, "Quaternions, Interpolation and Animation", University of Copenhagen, Technical Report DIKU-TR-98/5, Jul. 17, 1998, pp. i-98.
Granieri, J.P., et al., "Stimulating Humans in VR", Proceedings of International 145 Conference on Application of Virtual Reality, Leeds, United Kingdom, Jun. 1994, British Computer Society, 21 pgs.
Hart, John C., et al., "Visualizing Quaternion Rotation", ACM Transactions on Graphics, 13(3), Jul. 1994, pp. 256-276.

(Continued)

Primary Examiner—Wesner Sajous
(74) Attorney, Agent, or Firm—Peter J. Gordon; John A. Hamilton (57) ABSTRACT

Subdividing rotation between two poses in three dimensions may be accomplished in three parts. First, data defining the two poses is obtained from the animation or modeling interface. Second, a path associated with the two poses is determined. Third, using quaternion interpolation, the roll between the two poses is interpolated at intermediate positions along the path. The amount of roll at each of these intermediate positions then may be applied to three dimensional structures used for character rigging.

18 Claims, 6 Drawing Sheets

OTHER PUBLICATIONS

Huang, Zhiyong, et al., "Interactive Human Motion Control Using A Closed form of Direct and Inverse Dynamics", Proc. Pacific Graphics 1994, Beijing.

Kim, Myoung-Jun et al., "A $C^2$-continuous B-spline Quaternion Curve Interpolating a Given Sequence of Solid Orientations", Computer Science Dept. KAIST, Korea, 1995, 16 pages.

Lake, Robert et al., "Dynamic Motion Control of an Articulated Figure Using Quaternion Curves", Dept. of Computer Science, University of Alberta, Aug. 18, 1995, pp. 1-11.

Maciel, Anderson, et al., "Anatomy-Based Joint Models for Virtual Humans Skeletons", Proceedings of the Compter Animation 2002, 14 pages.

Monheit, Guy et al., "A Kinematic Model of the Human Spine and Torso", IEEE Computer Graphics & Applications, Mar. 1991, pp. 29-38.

Nedel, L.P., et al., "Modeling and Deformation of the Human Body Using an Anatomically-Based Approach", In Proceedings of Computer Animation '98, Philadelphia, PA, Jun. 1998, pp. 34-40.

Parnianour, M., et al., "A Computational Method for Simulation of Trunk Motion: Towards a Theoretical based Quantitive Assessment of Trunk Performance", Biomedical Engineering, Application, Basis, and Communication 1999. (A shorter version appeared in PD. vol. 77, Engineering Systems Design and Analysis, vol. 5, ASME, 1996, pp. 69-76).

Raisani, Jabbar, "Synthesizing Realistic Spine Motion Using Traditional Rig Controllers", Senior Thesis, Dept. of Computer Science at Trinity University, Apr. 21, 2004, pp. 1-41.

Sheepers, Ferdi, et al., "Anatomy-Based Modeling of the Human Masculature", Computer Graphics (ACM SIGGRAPH Proceedings) 1997, pp. 163-172.

Shoemaker, Ken "Animating Rotation with Quaternion Curves", SIGGRAPH '85, San Francisco, Jul. 22-26, 1985, vol. 19, No. 3, 1985 ACM 0-89791-166-0/85/007/0245, pp. 245-254.

Wilhelms, Jane et al., "Anatomically Based Modeling", in Computer Graphics, Los Angeles, CA, Aug. 1997, ACM SIGGRAPH Conference Proceedings, pp. 173-180.

* cited by examiner

FIG. 1A

Straight Spine

FIG. 1B

Add 10 degrees of roll to the bottom vertebra

FIG. 1C

Add 10 degrees of roll to the 4th vertebra

SUBDIVIDING ROTATION IN A CHARACTER USING QUATERNION INTERPOLATION FOR MODELING AND ANIMATION IN THREE DIMENSIONS

BACKGROUND

In three-dimensional modeling and animation, characters typically have a skeletal structure in which elements may be rotated or rolled. Such characters may include humanoid, animal or imaginary characters. These skeletal structures include, but are not limited to, spines, necks and other appendages that rotate, such as arms, legs or tails. In these structures, it is often desirable to have the rotation or roll distributed or divided over the elements to realistically simulate motion and poses. As a result, roll division presents a fundamental problem in three dimensional character setup and animation for almost all characters.

These skeletal structures typically are approximated using a set of objects that are manipulated using inverse or forward kinematics. Such a structure typically is created using a representation of a skeleton that includes a hierarchy of objects. In such a hierarchy of objects, a manipulation applied to an element is applied to other elements that are below it in the hierarchy. For example, an animation on a spine typically involves manipulating individual vertebra, and any rotation of one vertebra automatically is applied to other vertebrae that are connected to it.

Figure 1A:
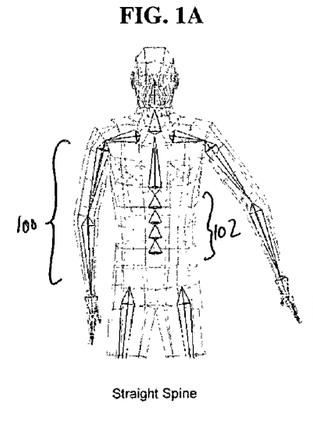
FIGS. 1A–1C illustrate a hierarchy of objects in a character.
Figure 1B:
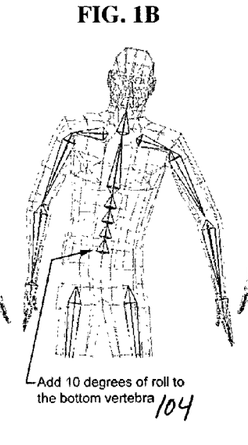
Figure 1C:
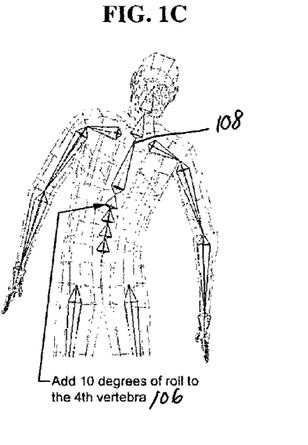
Figure 2A:
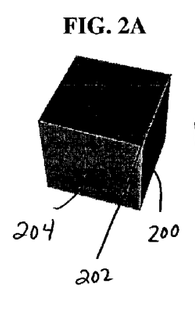
FIGS. 2A–2E illustrate a problem of shearing in a rotated object.
Figures 2B, 2C, 2D:
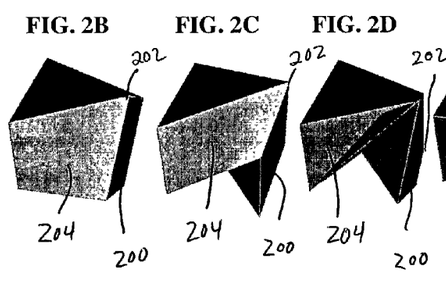
Figure 2E:
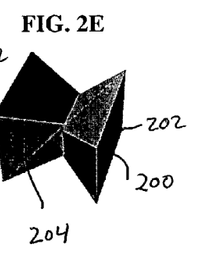

For example, referring to FIGS. 1A–1C, a skeleton with a spine 100 defined by a hierarchy of vertebra 102 is shown. In particular, FIG. 1A shows a character with a straight spine. In this example, the hierarchy of vertebra 102 is defined upwards, meaning a change in one vertebra causes a change in the vertebra above it. If ten degrees of rotation is added to the bottom vertebra 104, as shown in FIG. 1B, then all the vertebra above it then have the same rotation and are at a ten degree angle. If another ten degrees of rotation is added to the fourth vertebra 106, as shown in FIG. 1C, then all the vertebra above the fourth vertebra have this additional ten degrees of rotation and are now at a twenty degree angle.

If the animator decided to move the bottom vertebra 104 to a certain orientation and leave the end of the spine 108 where it is in FIG. 1C, then the animator would have to counter-animate the end of the spine 108. That is, the animator would first place the bottom vertebra 104 at a desired position, and then would reposition the other spine elements above until the end of the spine 108 was in the same position as in FIG. 1C. This process of counter-animation wastes a significant amount of time while animating or posing a character, especially when fine adjustments are repeatedly made to the lower body, which then entails similar fine counter-animation to the upper body.

A parallel problem, called pinching, may occur when an appendage, such as an arm, is rotated. An example of pinching is shown in FIGS. 2A–2E, which illustrates rotation of a cube. As the corner 202 and face 200 are rotated from the orientation in FIGS. 2A to the orientation shown in FIG. 2E, the face 204, for example, is pinched inwards. This same kind of pinching occurs in three-dimensionally animated characters that have rotating parts, such as arms and legs, which often requires corrective steps to be taken to modify the form or shape of the rotating part.

SUMMARY

These problems are solved by subdividing rotation using quaternion interpolation. Subdividing rotation between two poses in three dimensions may be accomplished in three parts. First, data defining the two poses is obtained from the animation or modeling interface. Second, a path associated with the two poses is determined. Third, using quaternion interpolation, the roll between the two poses is interpolated at intermediate positions along the path. The amount of roll at each of these intermediate positions then may be applied to three dimensional structures used for character rigging.

In one embodiment, a skeletal structure of a three-dimensional character that includes interconnected elements that rotate is defined by two control objects and one or more interconnected elements between them. The control objects may represent, for example, a structure in the lower body such as the hips and a structure in the upper body such as the chest. The interconnected elements between them may represent, for example, vertebrae of the spine. Each control object has a pose that is defined by a position and orientation in three-dimensional space. The orientation is defined by a direction and a roll around that direction. A path is defined between the poses of the two control objects. One or more additional control parameters may define the form, nature or algorithm of the path. The interconnected elements, e.g., vertebrae, are positioned along the path. The direction of each element is determined by the tangent to the path at the position of the element along the path. The roll of each element is determined using quaternion interpolation between the rotation of the first control object and the rotation of the second control object.

In another embodiment, to avoid the pinching problem, as in FIGS. 2A–2E, quaternion interpolation is used to subdivide rotation on an envelope, muscle or skin or other structure being driven by a controlling structure. This embodiment is particularly useful for modeling and animating structures such as arms, legs, tails, and other appendages that may rotate.

DETAILED DESCRIPTION

Figure 3:
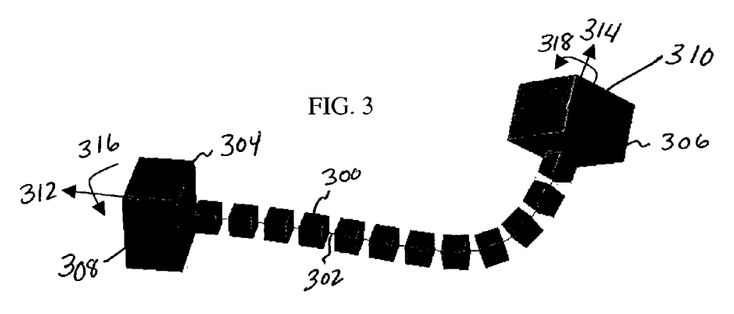
FIG. 3 is a descriptive illustration of a spine or other similar skeletal structure.

Referring to FIG. 3, a spine or other similar skeletal structure of a character may be defined using a combination of one or more elements 300 along a path 302 between a first control object 304 and a second control object 306. Each control object has a position (308, 310) and an orientation in three-dimensional space. The orientation is described as a direction (312, 314) and a roll (316, 318) around that direction. Similarly, each element 300 has a position and an orientation. For a spine, the first control object may correspond to a structure in the lower body, such as the hip. The second control object may correspond to a structure in the upper body, such as a chest or ribcage.

The path 302 is derived from two vectors corresponding to the orientations of the control objects. These two vectors may be used to define a curve, for example, a Bezier curve or a NURBS curve, in three-dimensional space. Control points representing these two vectors, and optionally additional control points of the curve, may be displayed through a user interface and may be manipulated or animated or controlled through an algorithm to modify the shape of the curve.

Figure 4A:
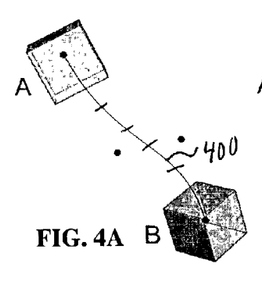
FIGS. 4A–4C graphically illustrate an example of how position, direction and rotation of elements may be determined.
Figure 4B:
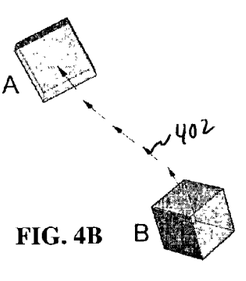
Figure 4C:
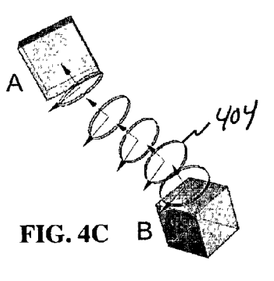

Referring now to FIGS. 4A–4C, how the position and orientation of each element is determined will now be explained. The position of each element on the path, shown in FIG. 4A is determined by defining the path and dividing the path into a number of segments 400 corresponding to the number of elements. The direction each element, shown in FIG. 4B, is defined by the tangent 402 to the path at the position of the element along the path. The roll 404 of each element, shown in FIG. 4C, is determined using quaternion interpolation between the orientations of the control objects. The result of quaternion interpolation is mapped to a vector in three-dimensional space. The roll of the element is set to be aligned with this vector. The result of applying this operation on each element is incremented roll division along the path between the control objects.

Figure 5:
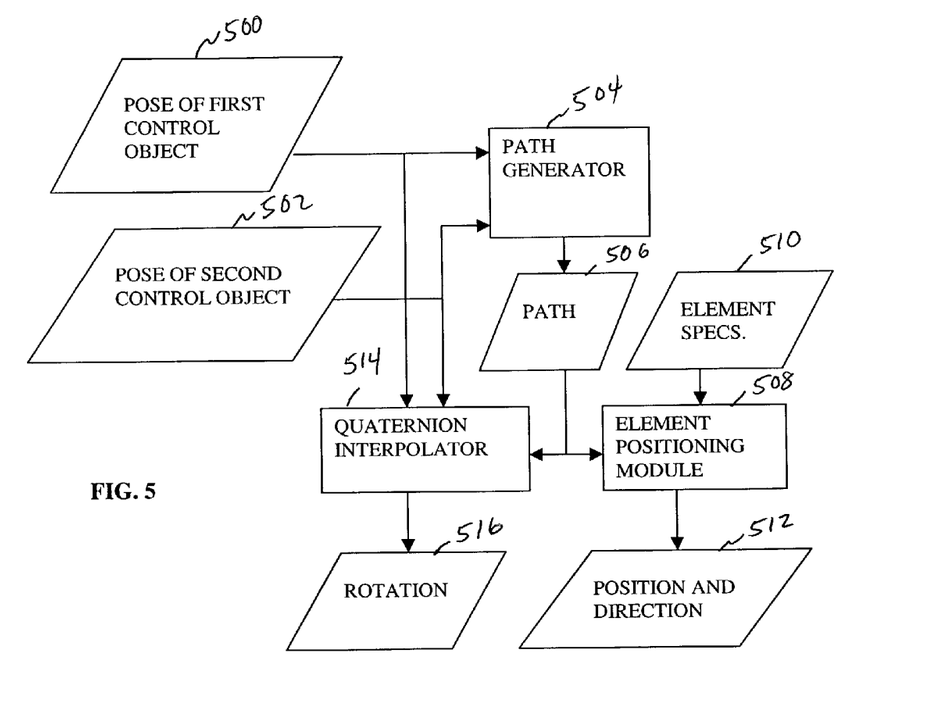
FIG. 5 is a data flow diagram illustrating an example of how position, direction and rotation of elements may be determined.

FIG. 5 is a data flow diagram describing how the pose of each element 300 (FIG. 3) may be determined. The pose 500 of the first control object and the pose 502 of the second control object are used by a path generator 504 to generate a defined path 506. For example, the path generator 504 may use the poses 500 and 502 to derive two vectors to specify a curve, for example a Bezier curve or NURBS curve, in three-dimensions. An element positioning module 508 uses the defined path and specifications 510 of the elements to determine the position and direction 512 of each element. The position of each element may be determined, for example, by uniformly dividing the path by the number of elements or by using a fixed distance between elements along the path or by some other method, as noted in connection with FIG. 4A. The direction for each element is determined by the tangent to the path at the position determined for the element along the path, as noted in connection with FIG. 4B. The defined path 506 and the poses 500 and 502 of the control objects are used by quaternion interpolator 514 to determine a value from which the rotation 516 of each element is determined, as described above in connection with FIG. 4C. The position and direction 512 and the rotation 516 of each element define the pose of each element between the first and second control objects.

The interpolation used to determine the rotation of each element may be a form of quaternion interpolation. Conventional quaternion interpolation is described, for example, in "Quaternions, Interpolation and Animation," by Erik Dam, Martin Koch and Martin Lillholm, Technical Report DIKU-TR-98/5, from University of Copenhagen, Department of Computer Science. Linear interpolation between quaternions, spherical linear interpolation (slerp) between quaternions, spherical spline interpolation between quaternions, and variations on these techniques may be used. Useful variations include those that minimize the tangential curvature using gradient descent.

In one example, using conventional spherical linear interpolation of quaternions, two paths from one orientation to another are determined along the surface of a hypersphere, and the shortest path is selected. Thus the maximum amount of rotation that can be computed is limited to 180 degrees in any direction on the surface of the hypersphere. That means, for example, that an amount of rotation that might be considered to be 220 degrees would be discarded in favor of the 140 degree path in the opposite direction. This limitation is enforced in a conventional implementation of spherical linear interpolation by computing the cross product between two quaternions. This cross product is used in the remainder of the interpolation calculations. If the cross product is negative, it is first inverted before it is used in the remainder of the interpolation calculations. A scaling value that is generated from the interpolation calculations also is inverted. Linear interpolation may be used if the quaternions are close together, for example, if their cross product is determined to be close to 1.0.

A number of strategies can be employed to increase range of rotation that can be achieved. For example, the shortest path decision can be eliminated from a conventional implementation of spherical linear interpolation. This decision is eliminated by removing the test for whether the computed cross product is negative, and by removing the related inversion operations. As a result, a range of 360 degrees in either direction can be achieved.

Figure 6:
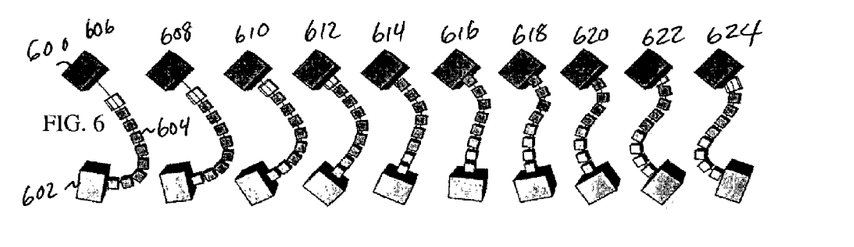
FIG. 6 is a descriptive illustration of several poses of a spine that may be produced in modeling or in an animation.

For either modeling or animation, the poses of the first and second control objects can be modified as shown in FIG. 6. In FIG. 6, each different pose 606–624 of the first and second control objects 600 and 602 results in different poses of the elements 604 between them. Using the techniques described above, a modeling tool may automatically generate the poses of the interconnected elements during setup of the character based on the positions of the control objects, or an animation tool may automatically generate the poses of the interconnected elements during an animation according to the poses of the control objects. The poses of the control objects can be animated using key frames, rigging techniques, an algorithm and other techniques. The different images in FIG. 6 may represent different poses displayed by a modeler or different orientations of the structure over time in an animation.

Figure 7:
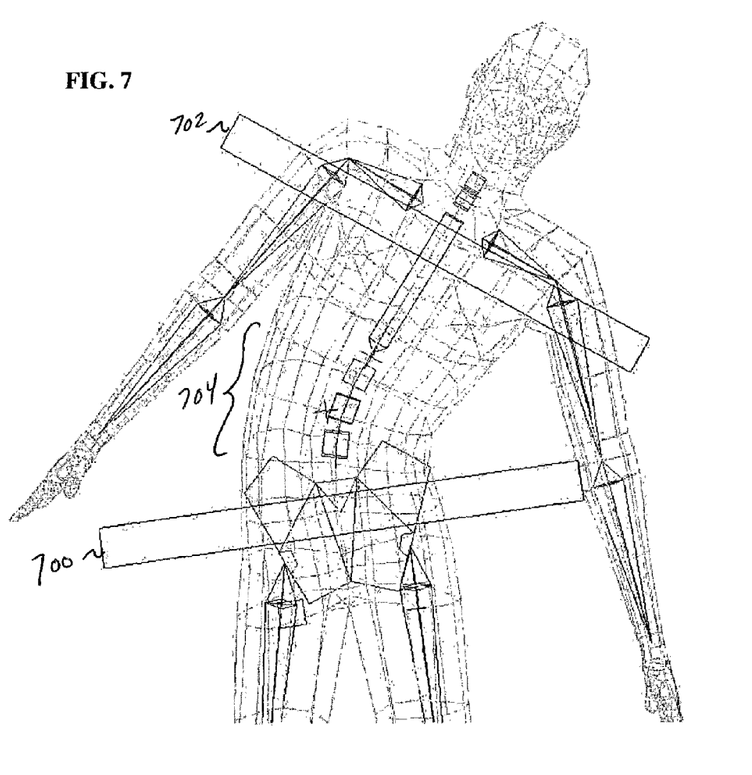
FIG. 7 graphically illustrates how counteranimation may be reduced.

Counter-animation is reduced by using these techniques because the poses of the interconnected elements, e.g., the vertebrae, are driven by the poses of the control objects, e.g, the hip and chest. For example, as shown in FIG. 7, the lower body structure 700 can be rotated (in comparison to FIG. 1C), without causing any movement to the upper body structure 702. The vertebrae 704 between the lower body structure 700 and the upper body structure 702 are automatically reassigned an appropriate roll using the techniques described above.

Because this example system can be dynamically proportioned to different sizes, it therefore becomes feasible to create standard skeletal structures for different types of characters. These dynamic skeletal structures may be used to transfer animation and attributes between different skeletal structures and as templates in a modeling system.

One problem that may arise, particularly during key-framed animation, is that the poses of the first and second control objects might cause the chain of elements to be stretched or compressed. Many strategies may be employed to solve this problem. For example, the path could be defined as a fixed length from one of the control objects where the other control object is free. Alternatively, the range of one of the control objects may be limited to the length of the path away from the other control object. Alternatively, the path length may be controlled using various interfaces and/or algorithms.

The foregoing examples illustrate a spine. The forearm, upper arm, thigh, and other appendages of characters, have similar problems of dividing roll. In these examples, the divided roll is applied to other structures describing the mass of the character, such as an envelope, muscles, skin or other objects. Quaternion interpolation can be used to subdivide the rotation along such appendages in a manner parallel to the example of the spine provide above.

Figures 8A, 8B, 8C:
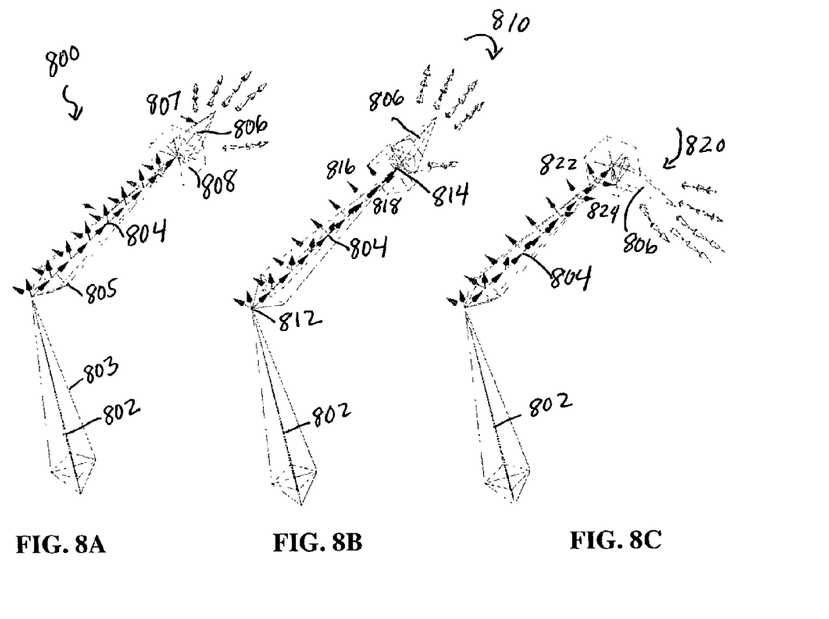
FIGS. 8A–8C graphically illustrate forearm roll.

Referring to FIGS. 8A–8C, an example based on roll of a forearm will now be described. In particular, an arm 800 having a bicep bone 802, a forearm bone 804 and a hand bone 806 is shown. The rotation of the hand is controlled by a hand controller roll input 808. The shapes 803, 805 and 807, for example, are merely icons, typically called chains in computer graphics, and do not represent the shape of the bones in three-dimensional space. Each bone is typically modeled as a straight line (or cylinder) having a position and direction and an associated rotation. FIG. 8A shows a forearm with no rotation. In FIG. 8B, a forearm controller is manipulated to rotate the forearm bone 804 as shown at 810, which in turn rotates the hand bone 806. This roll affects the forearm by affecting any structures, such as an envelope, skin or muscle, associated with the forearm bone 804. For example, any skin should twist from one end of the forearm 812 to the other end of the forearm 814. The rotation along the forearm bone from the bicep bone to the hand bone is subdivided using quaternion interpolation as indicated by the arrows 816 and 818. Further movement of the hand bone 806, as shown at 820 in FIG. 8C, causes a further rotation to be associated with the forearm, as indicated by the arrows at 822 and 824.

Figures 9A, 9B:
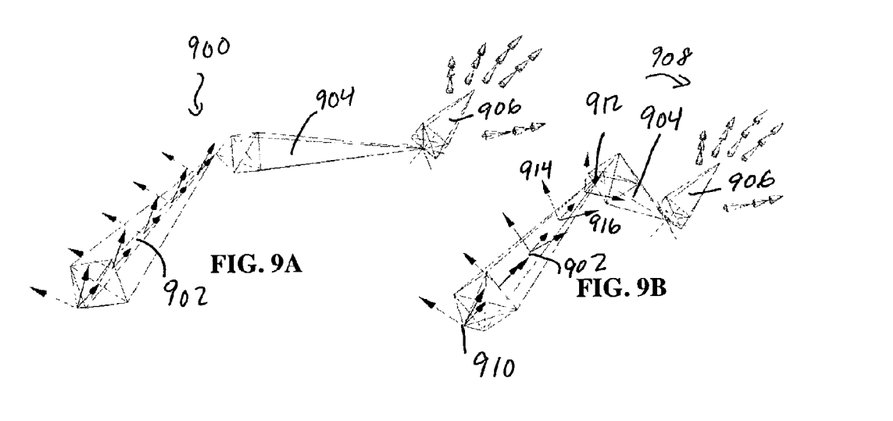
FIGS. 9A–9B graphically illustrate bicep roll.

Similarly, an example of roll of a bicep of an arm is illustrated in FIGS. 9A–9B. In particular, an arm 900 having a bicep bone 902, a forearm bone 904 and hand bone 906 is shown. The position and orientation of the bicep bone 902 affects the orientation of the forearm bone 904 and everything below it. FIG. 9A illustrates the bicep bone without any rotation. In FIG. 9B, the bicep bone 902 has been rotated 908 to a new position. The rotation of the bicep affects any structures, such as an envelope, skin or muscle, associated with the bicep. For example, any skin should twist from one end 910 of the bicep to the other end 912. The rotation along the bicep bone from the shoulder (not shown) to the forearm bone is subdivided using quaternion interpolation as indicated by the arrows 914 and 916.

It will now be described in more detail how quaternion interpolation may be used to subdivide rotation associated with such appendages, or other similar structures, will now be described in more detail.

Figure 10:
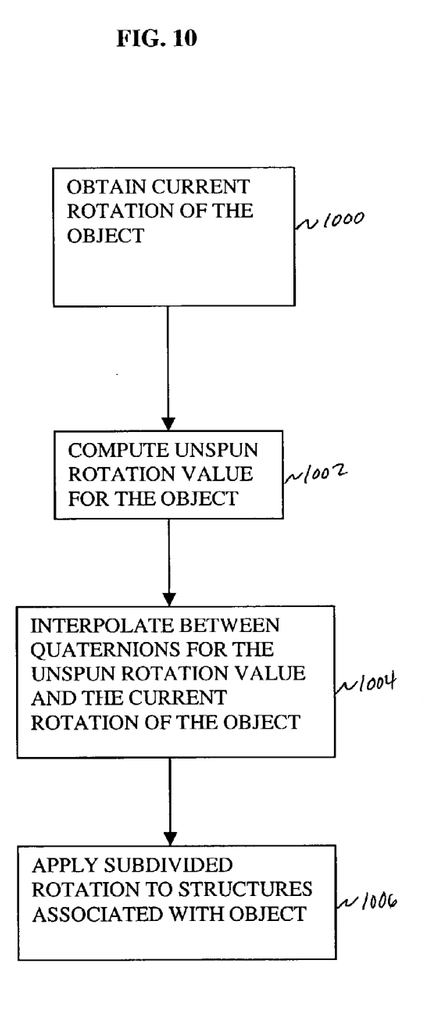
FIG. 10 is a flowchart describing how rotation may be distributed over set of interconnected elements using quaternion interpolation.
Figure 11:
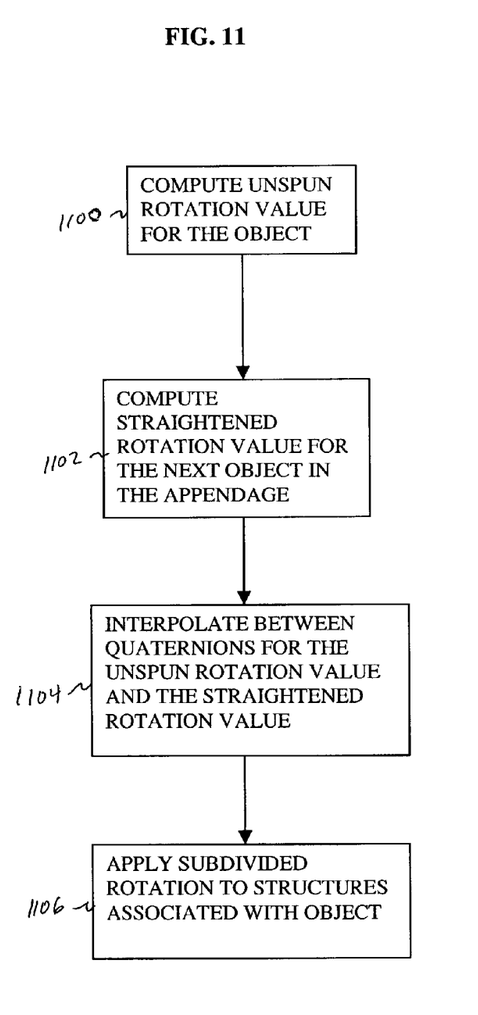
FIG. 11 is a flow chart illustrating an example of how rotation may be subdivided along an object that is defined in a hierarchy of objects.

FIGS. 10 and 11 are flow charts describing examples of how rotation may be subdivided along an object that is defined in a hierarchy of objects. The process of FIG. 10 would be used to subdivide rotation along an object such as a bicep, thigh or other similar skeletal structure. For example, this process could be used for the first bone of an appendage. The process of FIG. 11 would be used to subdivide rotation along an object such as a forearm or lower leg or other similar structure. For example, this process could be used for the second bone of an appendage. In both of these examples, two poses in three dimensions are identified. The first pose is associated with one end of the object and the second pose is associated with the other end of the object. Using quaternion interpolation between the first pose and the second pose, an amount of roll is determined at intermediate positions along the object. The amount of roll determined for each intermediate position along the object then may be applied to structures driven by the object.

Referring now to FIG. 10, a first rotation value is the current rotation of the object, as indicated at 1000. A second rotation value, an "unspun" rotation value, for the object is determined in 1002. The unspun rotation is the minimum rotation that the object could have if it were rotated towards its current direction from the pose of its parent object. Quaternion interpolation, as described above, is then used in 1004 to interpolate, for intermediate positions along the object, between the unspun rotation value and the actual rotation of the object to determine the subdivide roll. The subdivided roll then may be applied 1006 to the structures, such as an envelope, skin, muscle or other structure, associated with the object.

Referring now to FIG. 11, an unspun rotation value for the object is determined in 1100, in the same manner as described above. A second rotation value, called a "straightened" rotation value, is then computed in 1102. The straightened rotation value is the rotation that the next control object in the appendage would have if this next object were rotated to match the direction of the current object, but maintaining its roll. Quaternion interpolation, as described above, is then used in 1104 to interpolate, for intermediate positions along the object, between the unspun rotation value and the straightened rotation value to determine the subdivided roll. The subdivided roll then may be applied 1106 to structures, such as an envelope, skin, muscle or other structure, associated with the object.

It is also advantageous using these techniques to combine multiple spine systems or arms systems together to allow animation and modeling of long appendages with multiple controllers. Such a combination of systems could be used, for example, to model and animate a snake like character or a character with a long neck or tail.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. An apparatus for subdividing rotation among three dimensional structures along a path in a three dimensional model, wherein each three dimensional structure is associated with an intermediate position along the path, comprising:
    means for receiving data defining a first pose and a second pose in three dimensions, wherein a pose is defined by at least a direction and a roll around the direction;
    means for receiving data defining the path associated with the first pose and the second pose;
    means for determining a direction for each of the intermediate positions along the path;
    means for determining an amount of roll around the direction at each of the intermediate positions along the path using quaternion interpolation between the roll of the first pose and the roll of the second pose; and
    means for applying the determined amount of roll at the intermediate positions along the path to the three dimensional structures associated with the intermediate positions.

2. A method for subdividing rotation among three dimensional structures along a path in a three dimensional model, wherein each three dimensional structure is associated with an intermediate position along the path, comprising:

receiving data defining a first pose and a second pose in three dimensions, wherein a pose is defined by at least a direction and a roll around the direction;

receiving data defining the path associated with the first pose and the second pose;

determining a direction for each of the intermediate positions along the path;

determining an amount of roll around the direction at each of the intermediate positions along the path using quaternion interpolation between the roll of the first pose and the roll of the second pose; and applying the determined amount of roll at the intermediate positions along the path to three dimensional structures associated with the intermediate positions.

3. A computer program product comprising:

a computer readable medium;

computer program instructions stored on the computer readable medium that, when executed by a computer, cause the computer to perform a method for subdividing rotation among three dimensional structures along a path in a three dimensional model, wherein each three dimensional structure is associated with an intermediate position along the path, comprising:

receiving data defining a first pose and a second pose in three dimensions, wherein a pose is defined by at least a direction and a roll around the direction;

receiving data defining the path associated with the first pose and the second pose;

determining a direction for each of the intermediate positions along the path;

determining an amount of roll around the direction at each of the intermediate positions along the path using quaternion interpolation between the roll of the first pose and the roll of the second pose; and applying the determined amount of roll at the intermediate positions along the path to three dimensional structures associated with the intermediate positions.

4. An apparatus for subdividing rotation among three dimensional structures along an element of a three-dimensional object, wherein each three dimensional structure is associated with an intermediate position along the element, comprising:

means for receiving data defining a first pose in three dimensions associated with an end of the element and a second pose in three dimensions associated with another end of the element, wherein a pose is defined by at least a direction and a roll around the direction;

means for determining a direction at each of the intermediate positions along the element;

means for determining an amount of roll around the direction at each of the intermediate positions along the element using quaternion interpolation between the roll of the first pose and the roll of the second pose; and means for applying the determined amount of roll at the intermediate positions along the element to the three dimensional structures associated with the intermediate positions.

5. A method for subdividing rotation among three dimensional structures along an element of a three-dimensional object, wherein each three dimensional structure is associated with an intermediate position along the element, comprising:

receiving data defining a first pose in three dimensions associated with an end of the element and a second pose in three dimensions associated with another end of the element, wherein a pose is defined by at least a direction and a roll around the direction;

determining a direction at each of the intermediate positions along the element;

determining an amount of roll around the direction at each of the intermediate positions along the element using quaternion interpolation between the roll of the first pose and the roll of the second pose; and applying the determined amount of roll at the intermediate positions along the element to the three dimensional structures associated with the intermediate positions.

6. A computer program product comprising:

a computer readable medium;

computer program instructions stored on the computer readable medium that, when executed by a computer, cause the computer to perform a method for subdividing rotation among three dimensional structures along an element of a three-dimensional object, wherein each three dimensional structure is associated with an intermediate position along the element, comprising:

receiving data defining a first pose in three dimensions associated with an end of the element and a second pose in three dimensions associated with another end of the element, wherein a pose is defined by at least a direction and a roll around the direction;

determining a direction at each of the intermediate positions along the element;

determining an amount of roll around the direction at each of the intermediate positions along the element using quaternion interpolation between the roll of the first pose and the roll of the second pose; and applying the determined amount of roll at the intermediate positions along the element to the three dimensional structures associated with the intermediate positions.

7. The apparatus of claim 1, wherein the three dimensional structures define a spine of the three-dimensional object.

8. The apparatus of claim 1, wherein the quaternion interpolation permits a determination of a rotation greater than 180 degrees.

9. The method of claim 2, wherein the three dimensional structures define a spine of the three-dimensional object.

10. The method of claim 2, wherein the quaternion interpolation permits a determination of a rotation greater than 180 degrees.

11. The computer program product of claim 3, wherein the three dimensional structures define a spine of the three-dimensional object.

12. The computer program product of claim 3, wherein the quaternion interpolation permits a determination of a rotation greater than 180 degrees.

13. The apparatus of claim 4, wherein the three dimensional structures define a spine of the three-dimensional object.

14. The apparatus of claim 4, wherein the quaternion interpolation permits a determination of a rotation greater than 180 degrees.

15. The method of claim 5, wherein the three dimensional structures define a spine of the three-dimensional object.

16. The method of claim 5, wherein the quaternion interpolation permits a determination of a rotation greater than 180 degrees.

17. The computer program product of claim 6, wherein the three dimensional structures define a spine of the three-dimensional object.

18. The computer program product of claim 6, wherein the quaternion interpolation permits a determination of a rotation greater than 180 degrees.

* * * * *